United States Patent [19]

Brandstetter et al.

[11] Patent Number: 4,866,129
[45] Date of Patent: Sep. 12, 1989

[54] IMPACT RESISTANT THERMOPLASTIC MOLDING MATERIALS

[75] Inventors: Franz Brandstetter, Neustadt; Adolf Echte, Ludwigshafen; Franz Haaf, Bad Duerkheim; Herbert Naarmann, Wattenheim, all of Fed. Rep. of Germany

[73] Assignee: BASF Aktiengesellschaft, Ludwigshafen, Fed. Rep. of Germany

[21] Appl. No.: 220,423

[22] Filed: Jul. 13, 1988

Related U.S. Application Data

[63] Continuation of Ser. No. 931,470, Nov. 17, 1986, abandoned, Continuation-in-part of Ser. No. 658,715, Oct. 9, 1984, abandoned, Continuation-in-part of Ser. No. 364,533, Apr. 1, 1982, abandoned.

[30] Foreign Application Priority Data

Apr. 7, 1981 [DE] Fed. Rep. of Germany ....... 3113953

[51] Int. Cl.[4] ...................... C08L 53/02; C08L 71/04
[52] U.S. Cl. ........................................ 525/92; 525/68; 525/236; 525/315; 525/316; 525/905
[58] Field of Search ............... 525/364, 533, 658, 715, 525/931, 470, 92, 905

[56] References Cited

U.S. PATENT DOCUMENTS

| | | | |
|---|---|---|---|
| 3,383,435 | 5/1968 | Czek | 525/68 |
| 3,792,005 | 2/1974 | Harlan, Jr. | 525/92 |
| 3,994,856 | 11/1976 | Katchman et al. | 525/92 |
| 4,128,602 | 12/1978 | Katchman et al. | 525/68 |
| 4,139,574 | 2/1979 | Cooper et al. | 525/92 |
| 4,196,116 | 4/1980 | Haaf et al. | 525/68 |
| 4,252,913 | 2/1981 | Katchman et al. | 525/92 |
| 4,412,037 | 10/1983 | Brandstetter et al. | 525/68 |
| 4,423,187 | 12/1983 | Brandstetter et al. | 525/68 |

Primary Examiner—Jacob Ziegler
Attorney, Agent, or Firm—Bruce E. Harang

[57] ABSTRACT

Impact resistant thermoplastic molding materials containing a styrene polymer modified with rubber to be impact resistant, a hydrogenated styrene containing block copolymer and a polyphenylene ether as well as optional additives in which 50 to 98 percent by weight of the particles of the flexible component of the impact resistant styrene polymer have an average particle diameter of equal to or less than 1.0 micron and 2 to 50 percent by weight of the particles of the flexible have an average particle diameter of equal to or greater than 2 microns.

3 Claims, No Drawings

IMPACT RESISTANT THERMOPLASTIC MOLDING MATERIALS

This is a continuation of application Ser. No. 931,470 filed on Nov. 17, 1986, now abandoned, which is a continuation-in-part of application Ser. No. 658,715, filed Oct. 9, 1984, now abandoned, which is a continuation-in-part of application Ser. No. 364,533, filed Apr. 1, 1982, now abandoned.

BACKGROUND OF THE INVENTION

1. Field of the Invention

The invention relates to new thermoplastic molding materials based on impact resistant styrene polymers containing polyphenylene ethers.

2. Prior Art

Thermoplastic materials which are suited for the manufacture of molded parts and which contain impact resistant styrene polymers employing a rubber and further containing polyphenylene ether are described, for instance, in U.S. Pat. Nos. 3,383,435; 4,128,602 and 4,128,603. Such molding materials are suited for the manufacture of molded parts which have a better dimensional stability when exposed to heat compared to those produced of impact resistant styrene polymers which are not mixed with polyphenylene ethers. Molding materials which contain linear or star-shaped hydrogenated styrene containing block copolymers in addition to the impact resistant polymers and polyphenylene ethers have also been described (for example, U.S. Pat. No. 4,167,507). Molded parts with particularly high impact resistance can be produced from these molding materials. While the physical properties are generally satisfactory, it has been found that the molding masses have unfavorable flow characteristics. In these prior art molding masses the flexible component of the impact resistant styrene polymer has a particle size distribution in the range of 0.8 micron to 2 microns.

The purpose of this invention was therefore the development of thermoplastic molding materials based on impact resistant styrene polymers and polyphenylene ethers which can be processed into molded parts with particularly high impact resistance and which have improved flow characteristics. This purpose is met by the molding materials of this invention which contain an impact resistant styrene polymer, a block copolymer containing a hydrogenated impact resistant styrene, and polyphenylene ether.

SUMMARY OF THE INVENTION

Thus, the object of this invention is an impact resistant thermoplastic molding material containing (A) 5 to 90 parts by weight of a mixture comprising
 (a) 50 to 90 percent by weight based on the weight of
  (A) of a styrene polymer modified with rubber to be impact resistant, and
 (b) 1 to 50 percent by weight based on the weight of
  (A) of a hydrogenated impact resistant styrene containing block copolymer,
(B) 95 to 10 parts by weight of a polyphenylene ether, and
(C) optionally commonly used additives in effective quantities with the total of the parts by weight (A) and (B) being equal to 100, with the flexible component of the impact resistant styrene polymer having a particle size distribution of 0.5 micron to 10 microns, wherein 50 to 98 percent by weight of the particles of the flexible components have an average particle diameter of equal to or less than 1.0 micron, and 2 to 50 percent by weight of the particles of the flexible component have an average particle diameter of equal to or greater than 2 microns.

DESCRIPTION OF THE PREFERRED EMBODIMENTS

Particularly well suited are those impact resistant thermoplastic molding materials wherein 85 to 95 percent by weight of the particles of the flexible components of the impact resistant styrene polymer have an average particle diameter of equal to or less than 1.0 micron, and 5 to 15 percent by weight of the particles of the flexible components of the impact resistant styrene polymer have an average particle diameter of 4 to 7 microns.

Thermoplastic molding materials are understood to be mixtures which can be processed to molded parts or semi-finished goods by thermoplastic processing within certain temperature ranges. The molding materials may be present in the form of granules of powder, or may be preformed by pelletizing or can be present in the form of panels and foils.

Impact resistant styrene polymers prepared by the addition of rubber are understood to mean products as they are described, for instance, by Echte in "Applied Makromolekulare Chemistry," Volume 58/59 (1977) on pages 175-198.

The impact resistant styrene polymers contained in the molding masses according to this invention may be prepared in accordance with any desired process as long as care is taken that the flexible components have the abovementioned particle size distribution. However, styrene polymers modified with rubber to be impact resistant and flexible components which have various particle sizes can be mixed with each other. Thus, the styrene polymers contained in the molding materials according to this invention may be produced by mixing 61 parts by weight of a polymer, the flexible component of which has an average particle size of 0.5 micron, with 4 parts by weight of a polymer, the flexible component of which has an average particle size of 6 microns.

Styrene polymers are understood to be polymers of monovinyl aromatic compounds. Monovinyl aromatic compounds include, for example, impact resistant styrene, or impact resistant styrene substituted by alkyl radicals at the nucleus or along the side chain.

The natural or synthetic rubbers normally used for rendering styrene polymers impact resistant are used for this purpose. In addition to natural rubber, suitable rubbers include polybutadiene, polyisoprene and mixed polymers of butadiene and/or isoprene with impact resistant styrene and other co-monomers which have a glass temperature below −20° C. Particularly well suited are butadiene polymers with a 1,4-cis content between 25 and 98 weight percent.

Polymers modified with rubber to be impact resistant are obtained by polymerization of the monovinyl aromatic compounds in the presence of the rubber. The polymerization is carried out in a well known fashion, either in bulk solution or in aqueous dispersion, with the rubber initially being dissolved in the monomer and this solution being polymerized.

When employing the solution polymerization process a maximum of 50 percent by weight of an inert diluting agent based on the monovinyl aromatic compounds can be added to this starting solution. Suitable inert diluting agents include, for example, aromatic hydrocarbons or mixtures of aromatic hydrocarbons. Toluene, ethyl benzene, the xylenes or mixtures of these compounds are preferred.

If the polymerization is carried out in an aqueous dispersion, solvents are generally no added. It is particularly advantageous to prepolymerize the rubber solution and the monomers in bulk and under the effect of shear forces until a conversion of approximately 45 percent is achieved. This reaction mass is then suspended in water and subsequently completely polymerized. Generally, this process is triggered by adding oil soluble initiators such as benzoyl peroxide, dicumyl peroxide, di-tertiary butyl peroxide, azo-diisobutyronitrile etc., or combinations of these materials which are free radical initiators. The preliminary polymerization can also be started thermally. Well known suspension agents are water soluble, high molecular weight compounds such as methyl Cellulose, oxypropyl Cellulose, polyvinyl alcohol, partially saponified polyvinyl acetates etc, or inorganic dispersants such as barium sulfate. The suspension agents are generally used in amounts of 0.1 to 5 percent by weight based on the organic phase.

For the polymerization in bulk or in solution, a temperature range between 50° C. and 250° C., preferably 100° C. to 200° C., is generally employed. During the first part of the polymerization the mixture must be well agitated, that is until $\leq 45$ percent of the monovinyl aromatic compound has been reacted. All of these polymerization processes are well known and are described in detail in the literature. A summarizing description can be found under Amos, Polym. Engng. Sci., 14 (1974), 1, pages 1 through 11, as well as in U.S. Pat. Nos. 2,694,692 and 2,862,906, in which further details may be obtained.

The flexible component in the sense of this invention is understood to be that part of the polymer, minus any possible pigments, which is modified with rubber to be impact resistant and which is insoluble in toluene at room termperature (25° C.). Thus, the flexible component corresponds with the gel component of the product.

The flexible component generally has a heterogeneous structure. As a rule it forms during the manufacturing process and the resultant quantity and degree of separation are influenced by the process conditions. It is a generally known fact that the solution of the rubber to be polymerized in the monovinyl aromatic monomers separates into two phases immediately after the reaction begins of which (1) a solution of the rubber and the monomeric vinyl aromatics initially forms the coherent phase, whereas (2) the solution of the polyvinyl aromatic and its own monomer remains suspended in it in droplets. With increasing conversion the amount of the second phase increases at the cost of the first and by the consumption of the monomers. This results in a change in the phase coherency. As this change takes place, drops of rubber solution form in the polyvinyl aromatic solution. However, these drops in turn include smaller drops of the phase which is now the external phase.

In addition to this process, a grafting reaction takes place during which chemical bonds are formed between the rubber molecules and the polyvinyl aromatics, resulting in the formation of graft polymers of the two components. This process is known and is described in detail, for instance, by Fischer, Applied Makromolecular Chemistry Vol. 33 (1973), pages 35 through 64.

The grafted as well as the mechanically enclosed portion of the polyvinyl aromatic in the rubber particles is to be considered part of the flexible component.

When the mixture has thoroughly polymerized, a heterogeneous flexible component which is incorporated in a rigid matrix of the polyvinyl aromatic and consists of grafted rubber particles with inclusions of matrix material (polyvinyl aromatic) is formed. The greater the amount of the enclosed matrix material, the greater is the amount of flexible component having a constant rubber content.

Thus, the amount of flexible component is not only a function of the amount of rubber used but also of the process control, particularly prior to and during the phase inversion. The particular modes are a result of specific processes and the expert is familiar with them. (See, for example, Freeguard, British Polymer Journal 6 (1974), pages 203–228; Wagner, Robeson, Rubber Chem. Techn. 43 (1970), page 1129 and the following.)

The amount of rubber which is dissolved in the monomer prior to polymerization, thus producing the starting solution, is appropriately chosen as a function of the vinyl conversion during the polymerization in such a manner that the flexible component content in the reesultant polymer of the monovinyl aromatic compounds modified to be impact resistant is at least 20 percent by weight, preferably 25 percent by weight and more, based on the impact resistant polymer. The requirement that the polyvinyl aromatic must form the coherent phase establishes the upper limit of the flexible component content at approximately 50 to 60 percent by weight. A flexible component content of 25 to 35 percent by weight based on the impact resistant polymer has proven to be particularly favorable for the thermoplastic molding materials according to this invention. The rubber component of the impact resistant polymer will then generally vary between 2 and 20 percent by weight, preferably 5 to 15 percent by weight.

The average particle size of the disperse flexible component can be determined, for example, by counting and evaluating with an electron microscope thin layers of the impact resistant polymer (compare F. Lenz, Journal for Scientific Microscopie, 63 (1956), page 50/56).

The particle size of the disperse flexible component phase is adjusted in a basically well known manner during the polymerization of the monovinyl aromatic compound, namely by adjusting the agitator speed during the first part of the polymerization, that is up to a conversion of the monomers of $\leq 45$ percent. The greater the particle size of the disperse flexible component phase is, the lower the agitator speed, and thus the lower are the shear stresses. The relationship between the agitator speed and the size and distribution of the rubber particles in the resulting impact resistant polymer is described, for example, in the cited work by Freeguard to which we refer to for additional details. The concerned required agitator speed for achieving the desired particle size of the disperse flexible component phase is, among other things, a function of the respective equipment conditions and is known to the expert or can be determined by a few simple tests.

The average particle size (weight average), of the disperse flexible component phase was determined by counting and averaging the particles being part of the same class size using thin layer electron microscopy. The cumulative distribution curve is determined by way of the volumes of the particles (third power of the apparent diameter) within the intervals. With a 50 percent ordinate value, the equivalent value can then be taken from the abscissa. The listed diameters represent an average value of at least 5000 particles.

The hydrogenated styrene containing block copolymers are copolymers of the type AB and/or ABA and/or (A-B)n-x. In these expressions A stands for a nonelastomeric polymer block of the monovinyl or mono inylidene aromatic compound, B represents an elastomeric hydrogenated block of a conjugated diene, n denotes a whole number of at least 3, and x stands for the radical of a multifunctional coupling agent, via which the branches (A-B) of the block copolymers are chemically bonded with each other.

Monovinyl and monovinylidene aromatic compounds which are taken in consideration for the composition of the non-elastomeric polymer blocks of the branched block copolymers in end positions include, for instance, impact resistant styrene, side-chain alkylated styrenes such as α-methyl styrene and the core substituted styrene such as vinyl toluene, ethyl vinyl benzene and others. The monovinyl and monovinylidene aromatic compounds may also be used as mixtures. Preferably, however, styrene is used alone.

Conjugated dienes which are particularly suitable for the hydrogenated polymers according to this invention include, for instance, 1,3-butadiene and isoprene. These dienes are used for the manufacture of the block copolymers either alone or as a mixture.

The molecular weights of the block copolymers can vary within wide limits. The use of very low molecular weights below 10,000, however, result in poor mechanical properties for the mixtures, whereas very high molecular weights, for instance, higher than 1,000,000, create difficulties in the processing. The block polymers should preferably contain between 15 and 50 percent by weight of vinyl aromatics.

The block copolymers may be produced in accordance with well known processes by successive polymerization of the monomers in solution in the presence of a mono lithium hydrocarbon as initiator, possibly by subsequent coupling of the resultant active, living, linear block copolymers with multifunctional reactive compounds as coupling agents, and subsequent selective hydrogenation of the olefinic double bonds of the resultant block copolymers. Mono lithium hydrocarbons suited as initiators include those having the general formula RLi, wherein R represents an aliphatic, cycloaliphatic, aromatic or mixed aliphatic-aromatic hydrocarbon radical with 1 to 12 carbon atoms, and particularly an aliphatic hydrocarbon radical. Examples include: ethyl lithium,(n-, sec-, tert-) butyl lithium, isoropyl lithium and phenyl lithium with n- and secondary-butyl lithium being particularly preferred.

Solvents normally used in the preparation of the block copolymers include inert aliphatic, cycloaliphatic or aromatic hydrocarbons such as n-hexane, heptane, isooctane; cyclohexane, cycloheptane, benzene, toluene and others. The polymerization is carried out in the presence of small quantities of polar solvents such as amines, alcoholates and particularly ethers such as tetrahydrofuran, dimethoxyethane, phenylmethyl ether and others. The polar solvents are generally used in quantities of 0.05 to 10 percent by weight, preferably of 0.1 to 2 percent by weight based on the entire solvent. The polymerization takes place under conditions which are normal for the anionic polymerization with lithium organic compounds, such as, for example, in an inert gas atmosphere excluding air and moisture. Generally the polymerization temperatures are between 0° and 150° C. and are preferably kept between 20° and 100° C.

For the preparation of radially branched block copolymers, the monovinyl and/or monovinylidene aromatic compounds are initially polymerized with the aid of the mono lithium hydrocarbons until the monomers are essentially completely reacted and subsequently the butadiene is added to the solution of the resultant active living polymer. The butadiene becomes attached to the active chain ends of the previously formed living polymers of the monovinyl and/or monovinylidene aromatic compounds forming polybutadiene blocks. After completion of the polymerization, but before deactivating the initiator, a multifunctional reactive compound is added to the reaction solution as a coupling agent. This multifunctional coupling agent should be at least trifunctional, that is, it should be capable of connecting with each other at, at least 3 or 4 of the previously formed active linear block copolymers at their terminal lithium-carbon bonds, forming a chemical bonding, in order to result in a single, coupled and thus radially branched block copolymer. The preparation of such branched copolymers by coupling is described, for example, in British Patent No. 985,614.

Suitable coupling agents are the well known multifunctional compounds such as polyepoxides, including epoxidized linseed oil, polyisocyanates, polyhalides, polyketones, polyanhydrides, ester group containing compounds, particularly esters of dicarboxylic acid such as diethyl adipate, as well as polyvinyl aromatic compounds, particularly divinylbenzene. The multifunctional coupling agent is generally added to the reaction solution in quantities which are equivalent with the amount of the initiator used. The coupling process can be carried out at the same temperature as the polymerization, and preferably takes place at a temperature range of 20° C. to 100° C.

Following the polymerization and advantageously prior to the isolation of the reaction product from the reaction solution, the olefinic double bonds of the resultant block copolymers are selectively hydrogenated. The selective hydrogenation can also be implemented in accordance with general practice with the aid of molecular hydrogen and catalysts based on metals or metal salts of the eighth group of the periodic system as is described, for example, in U.S. Pat. No. 3,113,986; German Application No. 1,222,260; German Published Application No. 2,013,263; or U.S. Pat. No. 3,700,633. In accordance with the description in this literature the selective hydrogenation of the olefinic double bond is preferably implemented in the homogeneous phase with catalyst based on salts, particularly the carboxylates, enolates or alkoxides of nickel, cobalt or iron, which are reduced with metal alkyls, particularly aluminum alkyl, under hydrogen pressures of 1 to 100 bars, and at temperatures between 25° C. and 150° C. The selective hydrogenation is continued until the content of olefinic double bonds in the block copolymer has been reduced to a residual share of less than 10 percent, preferably less than 5 percent. The remaining amount of olefinic double bonds is determined by titration according to Wijs or by infrared spectroscopic analysis. Particularly, the hydrogenation process is continued until the olefinic double bonds are essentially completely reduced. Preferably the hydrogenation is controlled in such a manner that the aromatic double bonds of the block copolymers are not attacked.

The polyethers are compounds based on polyphenylene oxides, disubstituted in the ortho position, wherein the ether oxygen of the one unit is bonded to the benzene nucleous of the adjacent unit. At least 50 units should be bonded to each other. In the ortho position to the oxygen the polyethers may contain hydrogen, halogen, hydrocarbons, which do not have a tertiary hydrogen atom in the alpha position, halogenated hydrocarbons, phenyl radicals and oxy hydrocarbon radicals. Thus, the following substances can be taken into consideration: poly (2,6-dichloro-1,4-phenylene)ether, poly(2,6-diphenyl-1,4-phenylene)-ether, poly(2,6-dimethoxy-1,4-phenylene)-ether, poly(2,6-dimethyl 1,4-phenylene-ether, poly(2,6-dibromo-1,4-phenylene)ether. Preferably used is poly(2,6-dimethyl-1,4-phenylene)ether. Particularly preferred are poly(2,6-dimethyl-1,4-phenylene)ethers with a limiting viscosity of about 0.45 to about 0.65 dl/g (measured in chloroform at 30° C.).

The aromatic polyethers may be produced by self-condensation of the corresponding monofunctional phenols by the effect of oxygen in the presence of a catalyst system as is described, for instance, in U.S. Pat. Nos. 3,219,625; 3,306,875; 3,956,442; 3,965,069; 3,972,851.

The mixtures of impact resistant styrene polymers, the block copolymers and a polyphenylene ether are produced in the equipment commonly used for mixing thermoplastic compounds such as kneaders, extruders, or roller mixers.

The mixtures of the styrene polymers modified to be impact resistant and polyphenylene ethers and hydrogenated block copolymers can also contain other commonly used additives such as pigments, dyestuffs, fillers, flame retardants, other compatible polymers, antistatics, antioxidants and lubricants.

Compared with well known molding materials, the molding materials according to this invention have an excellent combination of good tenacity and flowability. In addition to this, these materials excel by their good dimensional stability when exposed to heat and additional favorable physical properties.

The following Examples are employed to exemplify the invention. All parts are by weight unless otherwise specified.

EXAMPLES AND COMPARISON EXAMPLES

EXAMPLE

An impact resistant polystyrene having a flexible component with an average particle size of equal to or less than 0.5 microns was obtained with the following formulation:

A solution consisting of

| | |
|---|---|
| 1,560 | grams styrene |
| 240 | grams butadiene/styrene block copolymer with a blurred transition between the blocks: [η] = 1.74 [dl/g] (toluene 25° C.); block polystyrene = 31.0 percent; [η] = 0.364 [dl/g] (toluene 25° C.); total styrene content = 41.6 percent. |
| 1.6 | percent t-dodecylmercaptan |
| 2.2 | percent octadecyl-3(3',5'-ditertiary-butyl-4-hydroxyphenyl)-propionate |
| 1.7 | percent dicumyl peroxide | was prepolymerized in a 5 liter flat paddle agitator at an internal temperature of 110° C., an agitator speed of 150 rpm until a solids content of 43.8 percent by weight was achieved.

Subsequently 1,800 milliliters of water containing 9.0 grams polyvinyl pyrrolidone having a K value of 90 and 1.8 grams of $Na_4P_2O_7$ were added and the agitator speed was increased to 300 rpm. After polymerization at 120° C. for 5 hours and 140° C. for 5 hours, the mixture was polymerized up to a styrene conversion of greater than 99 percent.

An impact resistant polystyrene containing a flexible component with an average particle size of approximately 6 microns was produced according to the following formula:

| | |
|---|---|
| 1,283 | grams styrene |
| 112 | grams polybutadiene (1,2-vinyl content approximately 9 percent by weight) |
| 1.5 | grams t-dodecylmercaptan |
| 1.5 | grams octadecyl-3(3',5'-di-tertiary-butyl-4'-hydroxyphenyl)-propionate |
| 1.5 | grams dicumyl peroxide |

A solution consisting of

| | |
|---|---|
| 1,283 | grams styrene |
| 112 | grams polybutadiene (1,2-vinyl content approximately 9 percent by weight) |
| 1.5 | grams t-dodecylmercaptan |
| 1.5 | grams octadecyl-3(3',5'-di-tertiary-butyl-4'-hydroxyphenyl)-propionate |
| 1.5 | grams dicumyl peroxide | was prepolymerized in a 4 liter flat paddle agitator at an internal temperature of 110° C. and an agitator speed of 150 rpm until a solids content of 25.4 percent by weight was achieved. Subsequently, 1,800 milliliters of water containing 9 grams of polyvinyl pyrrolidone having a K value of 90 and 1.8 grams of $Na_4P_2O_7$ were added and the 7 agitator speed was increased to 300 rpm. By an after-polymerization at 110° C. for 3 hours and 120° C. for 3 hours and 140° C. for 4 hours the mixture was polymerized to a styrene conversion of better than 99 percent.

By mixing these two impact resistant polystyrenes, the average particle sizes listed in the table were obtained.

An impact resistant polystyrene with an average particle size of 1.1 microns was produced according to the following formula for the comparison tests:

A solution of

| | |
|---|---|
| 1,283 | grams styrene |
| 112 | grams polybutadiene (1,2-vinyl content approximately 9 percent by weight) |
| 1.5 | grams t-dodecylmercaptan |
| 1.5 | percent octadecyl-3(3',5'-di-tertiary-butyl-4'-hydroxyphenyl)-propionate |
| 1.5 | percent dicumyl peroxide | was prepolymerized in a 4 liter flat paddle agitator at an internal temperature of 110° C. and an agitator speed of 150 rpm until a solids content of 20.4 percent by weight was achieved. Following this, 1,800 milliliters of water containing 9 grams of polyvinyl pyrrolidone having a K value of 90, and 1.8 grams $Na_4P_2O_7$ were added and the agitator speed was increased to 300 rpm. By afterpolymerizing at 110° C. for 3 hours, 120° C. for 3 hours and 140° C. for 4 hours, the mixture was polymerized to a styrene conversion of greater than 99 percent.

The hydrogenated block copolymer was A-B-A type with a styrene component of 30 percent by weight and an average molecular weight of A of approximately 1,700 and of the AB type having a styrene component of 50 percent by weight and an average molecular weight of A of 42,000.

The parts by weight of the polystryrene modified to be impact resistant, the poly(2,6-dimethyl-1,4-phenylene)ether and the hydrogenated sytrene containing block copolymers listed in the table with 0.8 parts by weight of tris(nonylphenyl)phosphite and 1.5 parts by weight of polyethylene, each were melted in a 2-shaft extruder at 280° C., were homogenized, mixed and granulated. The poly(2,6-dimethyl-1,4-phenylene)ether had a limiting viscosity of 0.48 dl/g.

Test bodies were produced from the mixtures at 280° C. using a spray injection machine.

The breaking energy for the test bodies was determined according to DIN 53 443, page 1, and the notch impact resistance was determined according to DIN 53 453 at 23° C. The flowability was evaluated by way of the melting index according to DIN 53 735.

The results are compiled in the table.

TABLE

| | Impact Resistant Polystyrene | | | Hydrogenated Block Copolymer | | Poly(2,6-dimethyl-1,4-phenylene)-ether | Melting Index 21.6 Kp at 250° C. | Notch Impact Resistance | Breaking Energy |
| | | Weight % of the Particles Having a Particle Size | | | | | | | |
| | [pbw] | <1 μm | >2 μm | [pbw] | Type | [pbw] | [g/10 Mins.] | [KJ/m$^2$] | [Meters] |
|---|---|---|---|---|---|---|---|---|---|
| Examples | | | | | | | | | |
| 1 | 71.25 | 90 | 10 | 3.75 | A-B-A | 25 | 193 | 11.6 | 29.0 |
| 2 | 67.5 | 90 | 10 | 7.5 | A-B-A | 25 | 174 | 16.5 | 29.4 |
| 3 | 52.25 | 90 | 10 | 2.75 | A-B-A | 45 | 44 | 15.6 | 26.8 |
| 4 | 49.5 | 90 | 10 | 5.5 | A-B-A | 45 | 40 | 17.9 | 45.5 |
| 5 | 71.25 | 90 | 10 | 3.75 | A-B | 25 | 120.3 | 12.6 | 22.9 |
| 6 | 67.5 | 90 | 10 | 7.5 | A-B | 25 | 112.9 | 14.2 | 27.2 |
| 7 | 52.25 | 90 | 10 | 2.75 | A-B | 45 | 25.3 | 12.0 | 30.6 |
| 8 | 49.5 | 90 | 10 | 5.5 | A-B | 45 | 23.2 | 15.1 | 30.2 |
| Comparison Examples | | | | | | | | | |
| A | 71.25 | 43 | 1 | 3.75 | A-B-A | 25 | 98 | 9.6 | 22.6 |
| B | 67.5 | 43 | 1 | 7.5 | A-B-A | 25 | 95 | 13.4 | 26.3 |
| C | 52.25 | 43 | 1 | 2.75 | A-B-A | 45 | 29 | 12.8 | 22.8 |
| D | 49.5 | 43 | 1 | 5.5 | A-B-A | 45 | 26 | 16.6 | 35.0 |
| E | 71.25 | 43 | 1 | 3.75 | A-B | 25 | 96 | 11.5 | 19.4 |
| F | 67.5 | 43 | 1 | 7.5 | A-B | 25 | 91 | 14.0 | 27.2 |
| G | 52.25 | 43 | 1 | 2.75 | A-B | 45 | 18 | 11.0 | 27.9 |
| H | 49.5 | 43 | 1 | 5.5 | A-B | 45 | 17 | 15.1 | 28.9 |
| I | 71.25 | 38 | 10 | 3.75 | A-B-A | 25 | 100 | 10.7 | 17.6 |

The embodiments of the invention in which an exclusive privilege or property is claimed are as follows:

1. An impact resistant thermoplastic molding composition, comprising:
   (A) from 5 to about 90 parts by weight of a mixture of:
   (a) 50 to 99 percent by weight relative to the mixture (A) of an impact resistant styrene polymer, wherein said impact resistance is imparted by the presence of from 20 to about 60 percent by weight relative to the weight of said impact resistant styrene polymer (a) of particles of a flexible component having a particle size distribution of from 0.5 to 10 microns, from 50 to 98 percent by weight of said flexible component particles having a mean particle diameter of less than or equal to 1.0 micron, and 50 to 2 percent by weight having a mean diameter of greater than or equal to 2.0 microns, said flexible component particles comprising a rubber selected from the group consisting of natural rubber, polyisoprene, polybutadiene, copolymers of butadiene and styrene, copolymers of isoprene and styrene, and terpolymers of butadiene, isoprene, and styrene; and
   (b) from 1 to about 50 percent by weight relative to said mixture (A), of a hydrogenated block copolymer of a monovinyl or monovinylidine aromatic compound and a conjugated diene; and
   (B) from 95 to about 10 parts by weight of a polyphenylene ether.

2. The molding composition of claim 1, wherein said monovinyl or monovinylidene compound is selected from the group consisting of styrene, α-methylstyrene, vinyltoluene, and ethylvinylbenzene.

3. The molding composition of claim 1, wherein said polyphenylene ether has an intrinsic viscosity of from about 0.45 to about 0.65 dl/g as measured in chloroform at 30° C.

* * * * *